March 7, 1972  G. GAZUIT  3,647,598
RADIAL TIRE MAKING DRUM
Filed Nov. 17, 1969  2 Sheets-Sheet 2
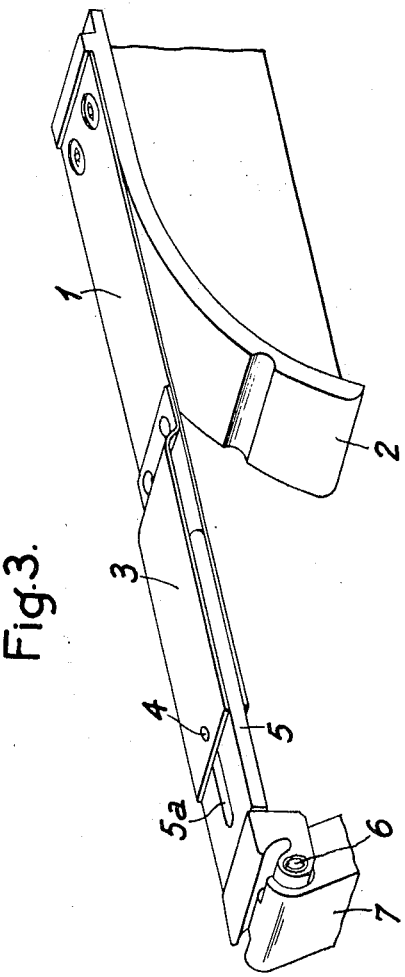
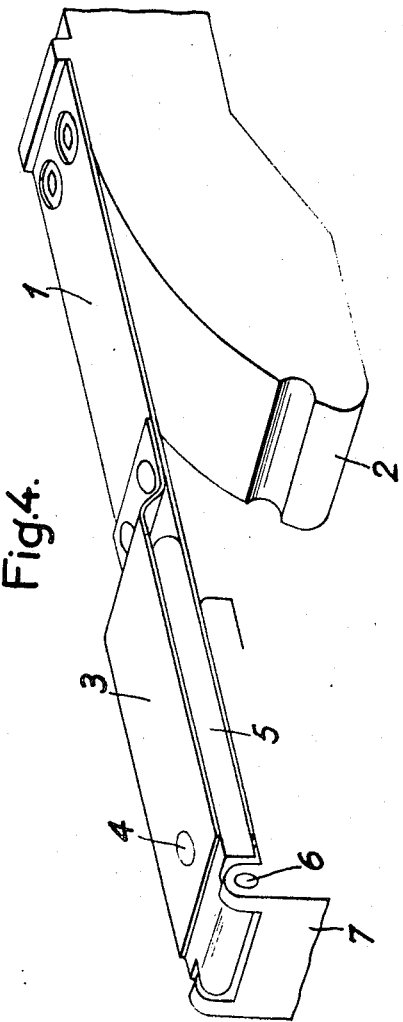
INVENTOR
GEORGES GAZUIT
Oberlin, Maky, Donnelly & Renner
ATTORNEYS

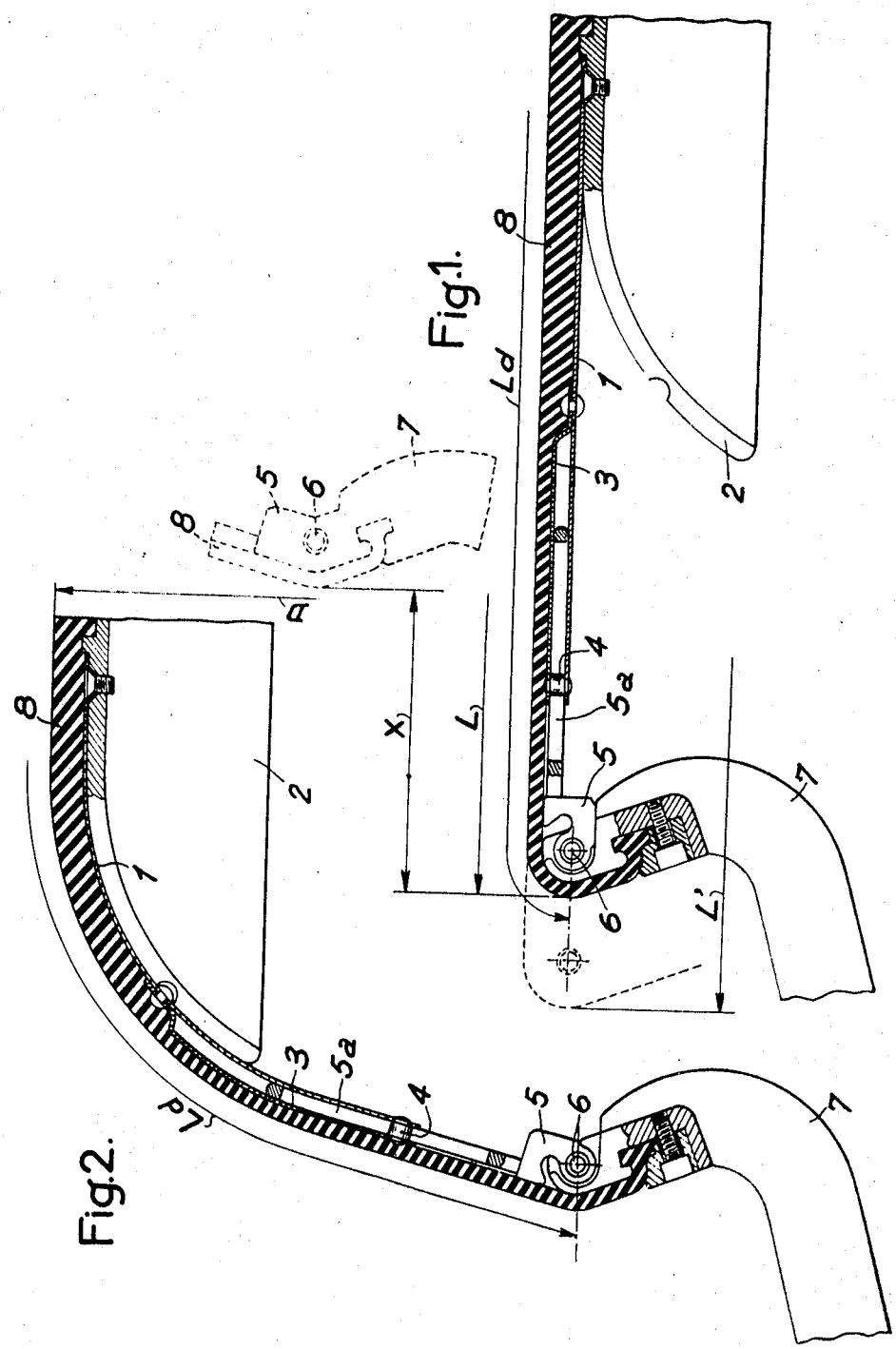

United States Patent Office 3,647,598
Patented Mar. 7, 1972

3,647,598
RADIAL TIRE MAKING DRUM
Georges Gazuit, Montlucon, France, assignor to
NRM Corporation, Akron, Ohio
Filed Nov. 17, 1969, Ser. No. 877,359
Claims priority, application France, Nov. 27, 1968,
175,506
Int. Cl. B29h *17/26*
U.S. Cl. 156—415                                   8 Claims

ABSTRACT OF THE DISCLOSURE

In this tire making drum of the rind type, described in the copending application Ser. No. 617,658, now abandoned in favor of applicant's continuation application Ser. No. 28,281, filed Apr. 22, 1970, entitled "Tire Building Machine," each one of the two ends of each spring blade is shaped for receiving a rigid sliding pull member of which the outer end carries means for pivotally connecting same to a pivot pin carried by the edge of the corresponding flange. The cavity receiving said rigid pull member is formed at either end of the spring blade by a shorter spring blade secured to the former and extending parallel thereto along a distance determined by a small distance piece, said pull member being flat and having a width preferably equal to that of said spring blades; it is guided for longitudinal sliding movement therebetween and retained in either of two end positions by the distance-piece engaging an elongated aperture formed in said pull member.

BACKGROUND OF THE INVENTION

This invention relates in general to tire manufacture and has specific reference to improvements in drums for making radial tires.

It is known that the manufacture of radial-carcass tires requires such a high degree of precision that all possible forms of adjustment means must be provided on the drums. To obtain a finished drum corresponding to well-defined dimensions, on the one hand, and to permit the manufacture of several tire sizes on a same drum, on the other hand, it is advantageous that the drum be adjustable and adaptable to possible carcass variations.

In the copending application Ser. No. 617,658, now abandoned in favor of applicant's continuation application Ser. No. 28,281, filed Apr. 22, 1970, entitled "Tire Building Machine," there is described a tire making drum comprising two flanges assembled by means of a flexible support consisting of flat springs covered with a resilient wall of which the edges are connected to a pair of flanges adapted to be disposed either in a spaced position wherein this flexible support assumes a cylindrical configuration for supporting the tire to be shaped, or a more approached position wherein this flexible support assumes a toroidal configuration produced and stiffened by the radial thrust exerted by a series of rigid sectors, in order to ensure the tire formation according to the desired profile.

In the construction described in the co-pending application Ser. No. 617,658, no means are provided for adjusting the width of this flexible support.

SUMMARY OF THE INVENTION

It is the object of the present invention to permit this adjustment. To this end, each one of the two ends of each flat spring is shaped for receiving a rigid sliding pull member of which the outer end carries means for hooking same to the edge of the corresponding flange.

BRIEF DESCRIPTION OF THE DRAWING

A specific form of embodiment of this invention will now be described by way of example with reference to the accompanying drawings; in which:

FIGS. 1 and 2 are quarters of cross-sectional views showing the support portion extending on one side of the transverse plane of symmetry and on one side of the axis, and the anchoring of this support portion on the edge of the corresponding flange, in the position permitting the proper arrangement of the elements to be shaped (FIG. 1) and in the position for completing the element shaping operation;

FIG. 3 is a fragmentary perspective view corresponding to FIG. 1, the resilient wall being removed from the assembly;

FIG. 4 is a view similar to FIG. 3 but showing a simplified modification of the assembly.

DESCRIPTION OF THE PREFERRED EMBODIMENT

The tire making drum according to this invention comprises a variable number of elements disposed along its outer periphery according to the dimensions of the tire to be made, each element comprising a spring blade 1 secured to the sector 2 in the transverse plane of symmetry of the drum which remains stationary throughout the radial movement performed by the sector 2 towards the major diameter D of the tire pre-shaping structure.

Another relatively short spring blade 3 is attached to the first blade 1 and somewhat spaced therefrom by means of a small distance-piece 4. A pull member 5 is fulcrumed to a pivot pin 6 carried by the edge of flange 7. A longitudinal slot 5a is cut in said pull member to permit the sliding movement of this member between two end positions along the distance determined by the spring blades 1 and 3. The metal assembly 1, 3, 4 and 5 is covered with a resilient wall 8 for example of molded rubber which is secured by its edges to the edges of flanges 7. The assembly therefore comprises a plain, continuous and rigid cylindrical surface both in its section and in its outer periphery.

As in the arrangement described in the copending application Ser. No. 617,658, now abandoned in favor of applicant's continuation application Ser. No. 28,281, filed Apr. 22, 1970, entitled "Tire Building Machine," adjustment means are provided for moving the flange 7 towards or away from the transverse plane of symmetry. The resilient wall 8 accommodates these movements but the same also applies to the metal structure consisting of the pull member 5 which can slide between the blades 1 and 3. Under these conditions, the width of the flexible support can be modified at will, for example from width L to width L'. When this adjustment has been completed the diameter D in the plane of symmetry and the distance X from the flange 7 to the same plane of symmetry must be increased simultaneously while preserving the developed length L*d*.

The supports 1, 3, 4, 5 and 8 will thus have a continuous, toroidal and rigid outer surface in its section and periphery, and substantial efforts can be exerted on this surface, such as the shaping of breakers, treads, and side walls disposed around the carcass.

I, therefore, particularly point out and distinctly claim as my invention:

1. A tire building machine including a drum having a flexible surface adapted to be converted from a substantially cylindrical to a substantially toric shape, a plurality of flexible metal straps extending between the ends of said drum, means operative to vary the length of said straps, each strap including two portions, means connecting said portions to permit limited relative movement therebetween, and a pin and slot connection between said portions, said slot extending lengthwise of said strap, one portion of said strap being bifurcated to enclose the other portion.

2. A tire building machine as set forth in claim 1 wherein said other portion is rigid.

3. A tire building machine as set forth in claim 2 wherein the pin extends between the bifurcations of said one portion spacing the same and through the slot in said other portion.

4. A tire building machine including a drum having a flexible surface adapted to be converted from a substantially cylindrical to a substantially toric shape, a radially movable crown section forming the center of the drum, a plurality of metal straps extending between the ends of said drum and said crown section, means operative to vary the length of said straps, each strap including two portions, and a pin and slot connection between said portions to permit limited relative movement therebetween, said slot extending lengthwise of said straps.

5. A tire building machine as set forth in claim 4 wherein one portion of said strap is bifurcated to enclose the other.

6. A tire building machine as set forth in claim 4 wherein one portion is flexible and the other portion is rigid.

7. A tire building machine as set forth in claim 6 wherein the rigid portion of said strap is pivotally connected to the ends of said drum and the flexible portion is connected to said crown section.

8. A tire building machine as set forth in claim 7 wherein said crown section includes a curved edge portion permitting the flexible portion of said strap to conform thereto as the drum is converted to toric shape.

References Cited

UNITED STATES PATENTS 1,577,664 3/1964 Tew _____ 156—414 X
3,485,692 12/1969 Frazier _____ 156—415 X

FOREIGN PATENTS 1,480,193 4/1967 France _____ 156—417

SAMUEL FEINBERG, Primary Examiner

S. C. BENTLEY, Assistant Examiner

U.S. Cl. X.R.

156—416